Figure 3:
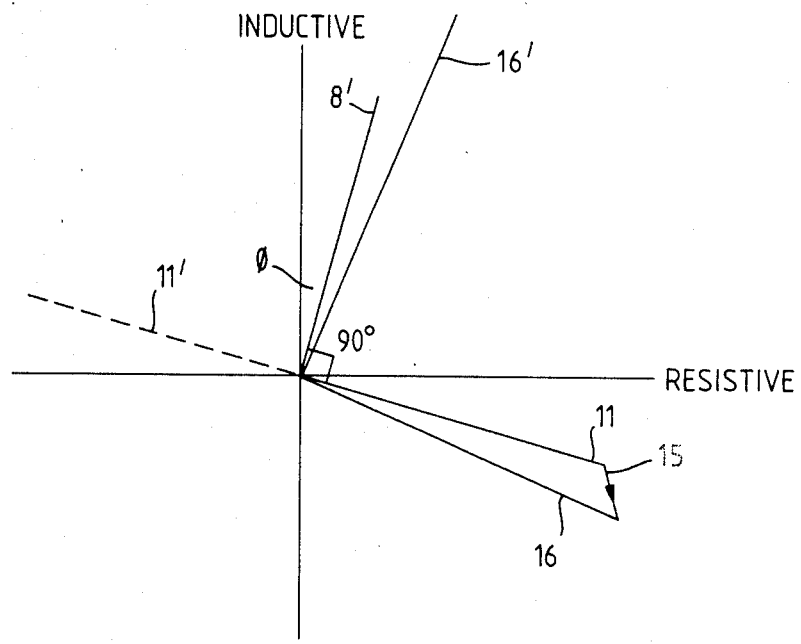

United States Patent [19]

Kerr

[11] Patent Number: 4,719,421
[45] Date of Patent: Jan. 12, 1988

[54] METAL DETECTOR FOR DETECTING PRODUCT IMPURITIES

[75] Inventor: Bruce G. Kerr, Gerrards Cross, England

[73] Assignee: Goring Kerr PLC, England

[21] Appl. No.: 882,250

[22] Filed: Jul. 7, 1986

[30] Foreign Application Priority Data

Jul. 8, 1985 [GB] United Kingdom ............... 8517257

[51] Int. Cl.[4] ..................... G01N 27/72; G01R 33/12; B07C 5/344
[52] U.S. Cl. .................... 324/233; 209/567; 324/239; 340/551
[58] Field of Search ............ 324/326, 329, 232–234, 324/238, 239–243; 340/551, 572; 361/180; 209/567

[56] References Cited

U.S. PATENT DOCUMENTS

| | | | |
|---|---|---|---|
| 3,029,380 | 4/1962 | Nicol | 324/233 |
| 3,566,258 | 2/1971 | Mori et al. | 324/233 |
| 3,676,772 | 7/1972 | Lee | 324/233 |
| 3,835,371 | 9/1974 | Mirdadian et al. | 324/329 |
| 4,070,612 | 1/1978 | McNeill et al. | 324/334 |
| 4,128,803 | 12/1978 | Payne | 324/329 |
| 4,249,128 | 2/1981 | Karbowski | 324/329 |
| 4,486,713 | 12/1984 | Gifford | 324/233 X |
| 4,563,645 | 1/1986 | Kerr | 324/233 |

Primary Examiner—Gerard R. Strecker
Attorney, Agent, or Firm—Stevens, Davis, Miller & Mosher

[57] ABSTRACT

In a metal detector, such as may be used in a bakery, an adjustable phase shifter is provided to adjust the detectors for different products. The adjustable phase shifter is controlled electronically from the output signal so that the arrangement is self-adjusting.

15 Claims, 10 Drawing Figures

PRIOR ART  Fig. 1.
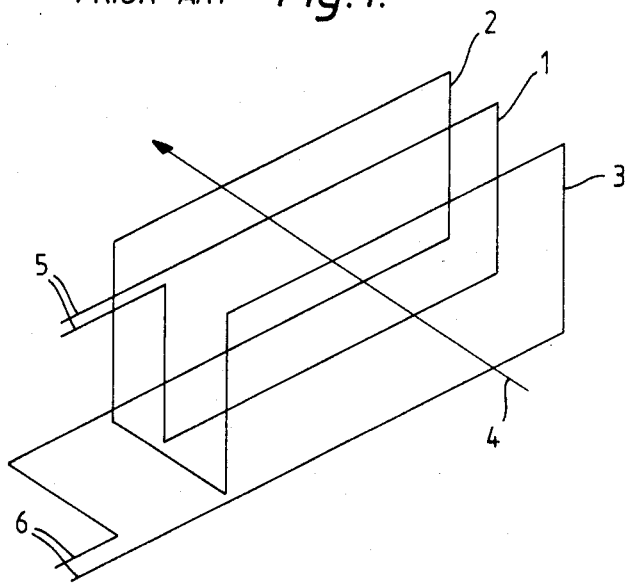
Fig. 2. PRIOR ART
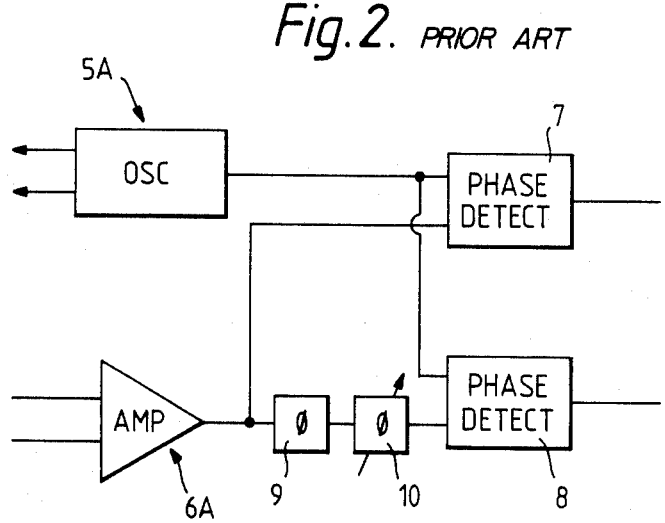

METAL DETECTOR FOR DETECTING PRODUCT IMPURITIES

This invention relates to a detector, such as a detector adapted to detect metal or other impurities in products.

In places such as bakeries it is necessary to be able to detect impurities, such as metal impurities, in the products, which may for example be bread or cakes.

It has been proposed to provide a detector system in which a first rectangular coil 1 is provided, as shown in FIG. 1 of the accompanying drawings, which is a diagrammatic view of part of the prior proposed device. Two similarly dimensioned coils 2, 3 are located on opposite sides of the first coil 1. A conveyor belt schematically indicated by the arrow 4, or some other device, is provided to convey items to be inspected through the three coils sequentially. The central coil 1 has terminals 5, and the outer coils are effectively connected in series opposition and have terminals 6.

As shown in FIG. 2, which is a block circuit diagram, an oscillator 5A is connected to the terminals 5 and thus energises the first coil. A field is established which energises the two other coils, and thus a signal is thus provided at the terminals 6 which is amplified by the amplifier 6A. An output terminal of the oscillator is connected to an input of a first phase detector or phase comparator 7, and also to a first input of a second phase detector or comparator 8. The output of the amplifier 6A is connected directly to a second input of the first phase detector 7, and through a fixed phase shifter 9 which imparts a 90° phase shift to the signal, and an adjustable phase shifter 10 which imparts a selectable phase shift to the signal, to the other input of the phase detector 8.

Each phase detector 8 provides a null output when the signals fed to it have a 90° relative phase shift.

When a typical product, such as a loaf of bread is passed through the coils, it is found that since the loaf is slightly conductive a product signal 11 is produced, as shown on FIG. 3, which is a diagrammatic figure given for purposes of explanation. This signal largely corresponds with the resistive loss vector, but will have an equal and opposite component 11' depending upon whether the product is between coils 3 and 1 or between coils 2 and 1. When the phase adjuster 10 does not provide any phase shift a signal 8' is provided at 90° to the product signal. By adjusting the phase shifter 10 to provide an angular shift of $\phi$ the signal 8' can be made to be purely inductive thus having no resistive component. Thus the phase detector 8 has a constant output.

Initially the described apparatus is set up so that as a proper or uncontaminated product passes through the coils there is no fluctuation on the output of the phase detector 8. However, if there is a metallic or other similar impurity in one product, the product signal 11 will have an impurity signal 15 added to it, leading to a new composite signal 16. This gives rise to a new inductive signal 16' which is angularly displaced from the inductive axis, and which thus has a resistive component. Consequently there is a signal fluctuation present on the output of the phase detector 8, and such a signal can be used to identify a faulty product.

Where various different products, such as different types of loaf, are inspected on one apparatus it is desirable to reset the phase shifter 10 when each different product is inspected. This is time consuming. It is possible to provide the phase shifter 10 with a number of selected pre-set phase shifts, but often operators do not use this facility, choosing merely to adjust the sensitivity of the device, so that all the different products are accepted on one sensitivity setting. This has the disadvantage that certain products containing impurities will not be identified as containing impurities.

Figure 4:
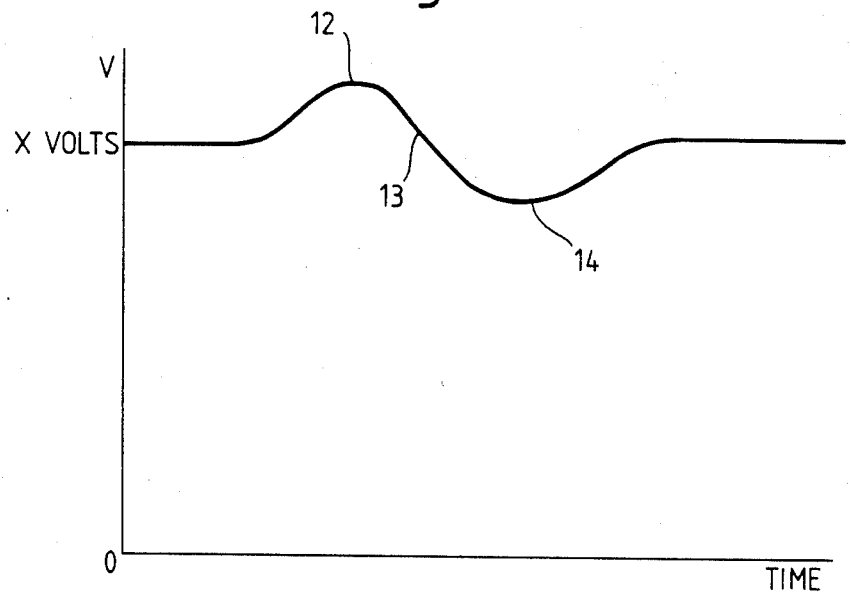

As can be seen in FIG. 4 the output, in volts, of the phase detector 8 as a product passes through the coils before the phase shifter 10 is adjusted is effectively a wave, with time. The first peak appears as the product passes between coils 3 and 1 with the null 13 appearing as the product passes through coil 1. The reverse peak 14 appears as the product passes between coils 1 and 2. It is desired that this wave should be as close to possible as a straight line as an uncontaminated product passes thought the described device, and that when the wave differs from a straight line configuration by a predetermined amount the product is identified in some way as being contaminated.

According to this invention there is provided a detector comprising a first energised coil through the field of which an item to be inspected is passed, a second coil arrangement within the field of the first coil which produces an output signal, part of the signal energising the first coil and the output signal of the second coil being fed to the inputs of two phase detectors, one input of a phase detector being associated with a 90° phase shifter and one input of a phase detector being associated with an adjustable phase shifter, the output of at least one phase detector being monitored to produce a control signal, the control signal being used to adjust said adjustable phase shifter.

Preferably the 90° phase shifter and the adjustable phase shifter are associated with one input of one phase detector.

Conveniently the voltage of the output of one phase detector is monitored by a voltage monitor to produce said control signal in response to variations in said voltage.

Preferably the output of the other phase detector is fed to a polarity detector which provides signals to the voltage monitor indicative of the polarity of the input to the said other polarity detector.

Conveniently the voltage monitor includes signal storing means, and switches controlled by the polarity sensor so that when one polarity is sensed the signal storing means are supplied with said voltage in one way, and when another polarity is sensed the signal storing means are supplied with said voltage in another way.

Advantageously the signal storing means comprise a first capacitor which is charged with the output of said phase detector when one polarity is sensed, and which is charged with the inverted output of that phase detector when the other polarity is sensed, there being a second capacitor which is charged with the output of said phase detector when no polarity is sensed.

In an alternative embodiment the signal storing means comprise two capacitors, one of which is charged with the outpt of said phase detector when one polarity is sensed, the other being charged with the output of said phase detector when the other polarity is sensed.

Preferably the capacitors are connected to a differential amplifier, the output of which provides the control signal for the adjustable phase shifter.

Preferably a delay is present between the voltage monitor and the adjustable phase shifter.

In an alternative embodiment of the invention the outputs of the first phase detector and the second phase detector are fed to the inputs of a third phase detector, the output of the third phase detector being connected by means of an RC delay network to the control terminal of said adjustable phase shifter.

Preferably means are provided to reduce the time constant of the RC network to enable a rapid setting of the detector to be obtained.

Advantageously said means to shorten the RC time constant comprise switchable means.

Figure 5:
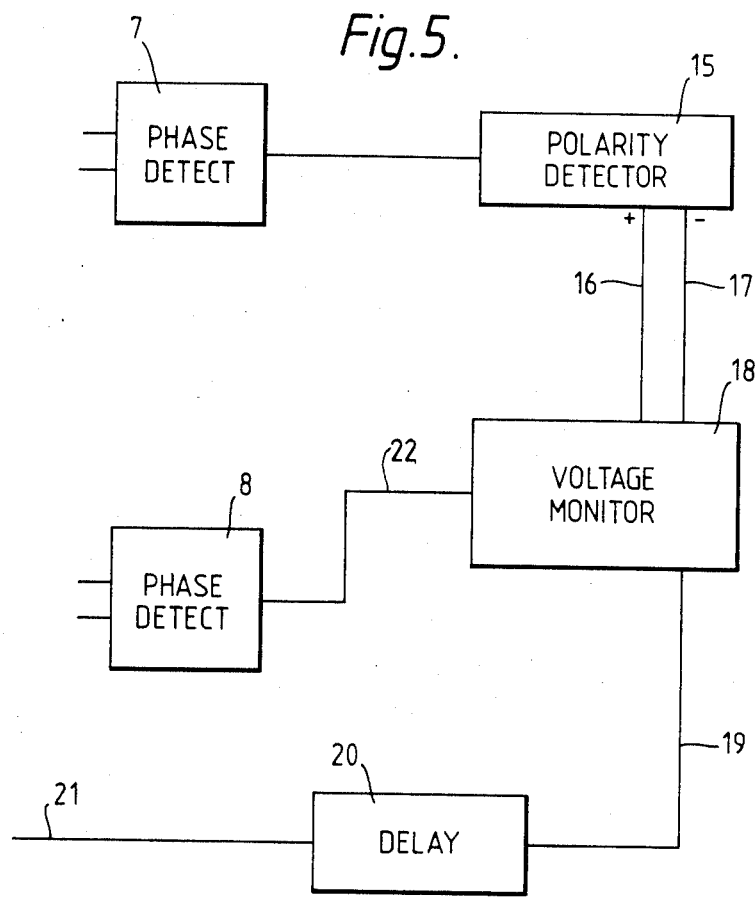
Figure 6:
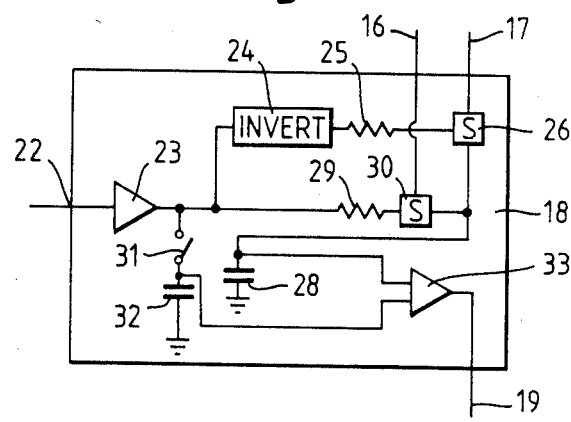
Figure 7:
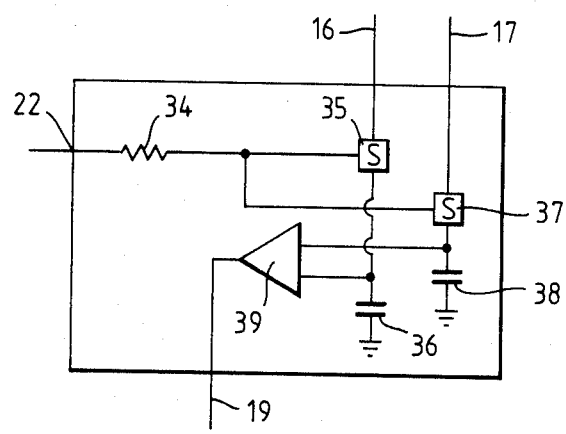

In order that the present invention may be more readily understood, and so that further features thereof may be appreciated, the invention will now be described by way of example with reference to the remaining figures of the accompanying drawings, in which FIG. 1 is a perspective view of prior art sensing coils;
FIG. 2 is a block diagram of a prior art detector;
FIG. 3 is a graph of resistive and inductive losses of the coil;
FIG. 4 is a graph of the output of the phase detector;
FIG. 5 is a block circuit diagram of part of an arrangement in accordance with the invention,
FIG. 6 is a block diagram of one type of voltage monitor that may be used in the circuit FIG. 5,
FIG. 7 is a block circuit diagram of another type of voltage monitor that may be used in the circuit of FIG. 5,
FIGS. 8, 9 and 10 are block circuit diagrams of modified embodiments of the invention.

Referring to the drawings the present invention is a modification or addition to the arrangement described above with reference to FIGS. 1 to 4. Thus the apparatus of FIGS. 1 and 2 is present, but will not be redescribed.

In this invention the output of the phase detector 8 is monitored, and if the waveform departs from the linear by more than a predetermined amount, the product is rejected. However, if the variation from the linear occurs more than a predetermined number of times when a number of products to be examined pass through the coils, the voltage monitor produces a control signal which is fed to the adjustable phase shifter 10, which in this invention is an electronically controllable phase shifter.

As can be seen in FIG. 5 the output of the phase detector 8 is fed to a voltage monitor 18. In the described embodiment the voltage monitor 18 also receives signals from a polarity detector 15 which is connected to the output of the phase detector 7. The polarity detector has a first output 16 which carries a signal whenever the input is positive, and a second output 17 which carries a signal whenever the input is negative. The output of the voltage monitor is fed through a delay line 19, to prevent undesired 'hunting', and through a lead 21 to the electronically controllable adjustable phase shifter 10.

FIG. 6 shows one type of voltage monitor. The output of phase detector 8 is fed through input 22 to an amplifier 23. The output of the amplifier is connected through an inverter 24 and a resistor 25 and a switch 26 which is only closed when a signal is present on the line 17 to a device adapted to store the signal, in this embodiment a capacitor 28, the other terminal of which is earthed. The output of the amplifier 23 is also connected through a resistor 29 and a switch 30 that is closed when a signal is present on the line 16 to the input terminal of the capacitor 28. The output of the amplifier 23 is also connected through a switch 31, which is arranged to be closed whenever both the switches 26 and 30 are open, to a second device adapted to store the signal, in the form of a second capacitor 32, the other terminal of which is earthed. The input terminals of the capacitors 28 and 32 are connected to a differential amplifier 33, the output of which is fed to the line 19.

In the voltage monitor a first signal representative of the average phase shift measured by the phase detector 8 whilst an item passes through the detector coils is stored, and a second signal representative of the average phase shift measured by the phase detector 8 is stored, and the stored signals are compared to produce a control signal for the adjustable phase shifter 10.

As can be seen from FIG. 3 the resistive component of the signals from the two phase detectors are always in phase or 180° out of phase. Thus as the signal from phase detector 7 goes positive the switch 30 is closed and the capacitor 28 charges up with the signal of the polarity (the first polarity) then provided by the phase detector 8. In the example of FIG. 4 this will be X volts plus the amplitude of the peak 12. When the output of the phase detector 7 goes negative the switch 30 is opened and the switch 26 is closed. The peak 14 is then inverted relative to the X volt line and the resultant is fed to the capacitor 28. During the period between products passing between the coils the switch 31 is closed and capacitor 32 is charged up to X volts. It will be seen that if the output of phase detector 8 is linear both capacitors 28 and 32 will carry the same voltage and there will be no output from the differential amplifier. Equally it will be understood that the magnitude of any non linearity (which is dependant on the phase shift) is reflected in the magnitude and polarity of the output of the differential amplifier and thus this signal can sensibly be used to control the adjustable phase shifter 10 to restore the desired operating condition.

In this arrangement the value of the signal from the phase detector 8 when the phase detector 7 has one polarity is stored and is compared with the value of the signal from the phase detector 8 when the phase detector 7 has the opposite polarity.

FIG. 7 illustrates another form of voltage monitor 18. In this case the input 22 is connected through a resistor 34 to a first switch 35, which is closed when a signal is present on line 16, and thus to a first capacitor 36, and through a second switch 37 which is closed when there is a signal present on the line 17 to a second capacitor 38. The capacitors are connected to the inputs of a differential amplifier 39, the output of which is fed to the line 19. It will be appreciated that the capacitor 36 will effectively store the value of the peak 12 of FIG. 4, which is X volts plus the size of the peak, and the capacitor 38 will store the value of the peak 14, that is X volts minus the value of the peak. It is only when the peaks are of insignificant size, i.e. when the output of the phase detector 8 is substantially linear, that no signal is generated at the output of the differential amplifier.

Figure 8:
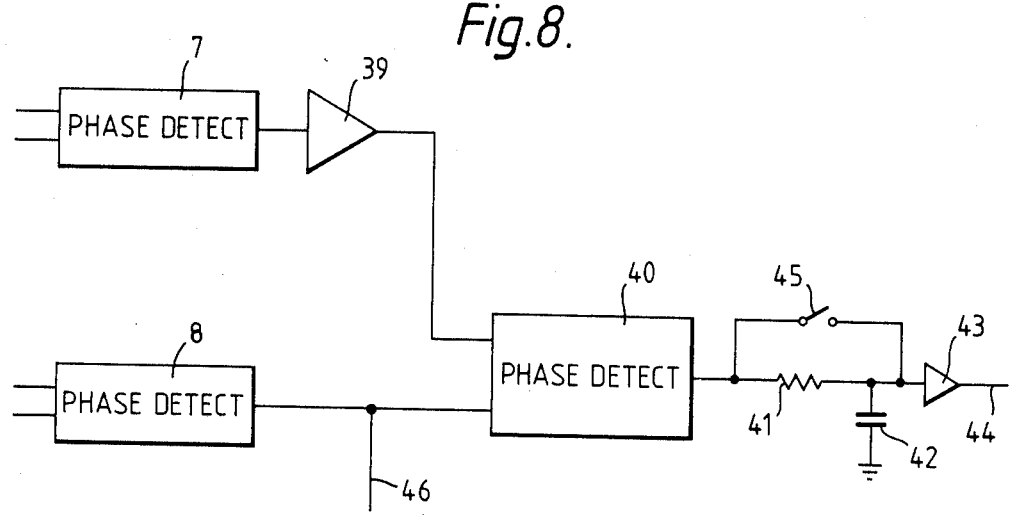

FIG. 8 illustrates a modified embodiment of the invention. It is to be understood that a problem may arise when the product being monitored by the described apparatus is electrically conductive due to a high moisture content combined with salt. This is a common situation with many food products. In such a case a very large resistive signal may be generated, and it is then critical that the adjustment of the variable phase shifter 10 is effected rapidly and accurately since short term errors may occur during warm up of the equipment. Of course, the setting of the adjustable phase adjuster varies with different product types, due to different moisture or salt content.

As in the previous embodiments the arrangement shown in FIG. 8 incorporates the phase detectors 7 and 8 as present in FIG. 1. The output of the two phase detectors 7 and 8 may be fed, optionally through amplifiers such as the amplifier 39, to a further phase detector 40. The output of the phase detector 40 is fed by means of an RC network 41, 42 and a further amplifier 43 to a lead 44 which is connected to the control input of the adjustable phase shifter 10. When an item such as a piece of metal passes through the coils the phase change that occurs is not immediately passed through the RC network, and thus the RC network operates as a combined smoothing and delay circuit. Thus there is no significant change in the output of the RC circuit when a single impurity is detected, but if the nature of the product being monitored changes, then the output of the RC network changes in response to the change in the product. The RC network may be by-passed by means of a switch 45 to shorten the RC time constant during an initial warm up period or when the product is suddenly changed. An output 46 is taken directly from the phase detector 8 to activate means responsive to a detected impurity.

Figure 9:
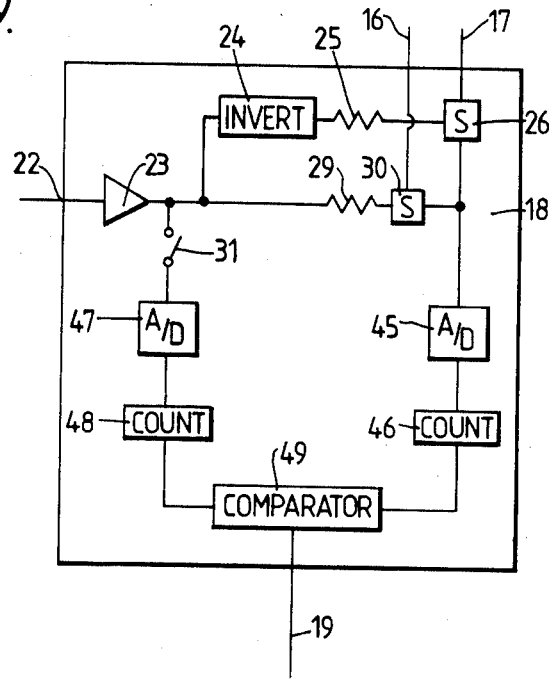

FIG. 9 illustrates an embodiment which is a modification of the embodiment of FIG. 6. Instead of signals being stored on capacitors the switches 26 and 30 are connected to an analog to digital converter 45 which produces a digital signal representative of the instantaneous amplitude of the signal. The digital signal is fed to a sampling adding counter 46 which obtains a count equivalent to the integral of the signal. The switch 31 is connected to a corresponding analog to digital converter 47 and counter 48. The outputs of the counters 46 and 48 are compared by a comparator 49 to produce a control signal.

Figure 10:
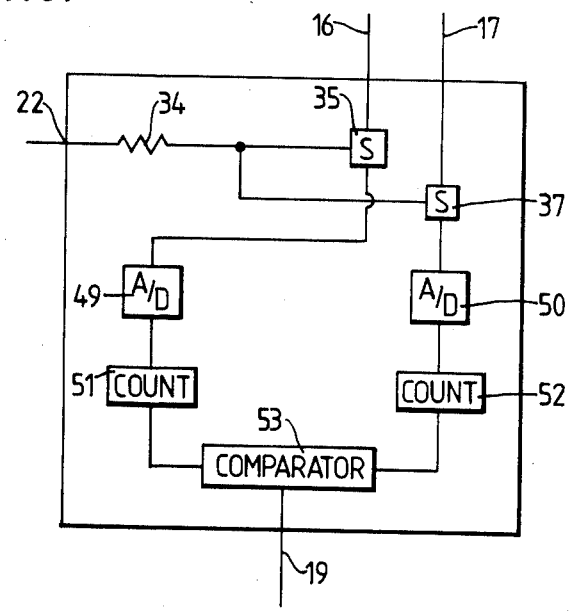

FIG. 10 illustrates an embodiment which is a modification of the embodiment of FIG. 6. The switches 35, 37 are each connected, via respective analog to digital converters 49, 50 to respective counters 51, 52 (corresponding to the counters 48, 46). The outputs of the counters are passed to a comparator 53 to generate the control signal.

What is claimed is:

1. A detector, said detector comprising: a first coil; means for energizing the first coil to produce an electromagnetic field;
means for passing an item to be inspected through the field of the first coil;
a second coil arrangement within the field of the first coil, said second coil arrangement producing an output signal based in part upon said electromagnetic field;
phase detector means;
means for providing as input signals to said phase detector means, the signal energising the first coil, and the output signal of the second coil;
at least a 90° phase shifter means for shifting the phase of one input of said phase detector means;
an adjustable phase shifter means, responsive to a control signal, for adjustable phase shifting one input of said phase detector;
means for monitoring the output of said phase detector means and for producing said control signal, said control signal being fed to said adjustable phase shifter to control the phase shift thereof.

2. A detector according to claim 1, wherein said phase detector means comprises;
at least two phase detectors both detectors having as one input said first coil energising signal, both detectors having as a second input the second coil output signal.

3. A detector according to claim 2 wherein the 90° phase shifter means and the adjustable phase shifter means are associated with one input of one phahse detector.

4. A detector according to claim 2 wherein a voltage monitor is provided, the voltage monitor acting to monitor the voltage of the output of one phase detector, the voltage monitor producing said control signal in response to the variations in said voltage.

5. A detector according to claim 4 wherein a polarity detector is provided, the output of the other phase detector being fed to the polarity detector so that the polarity detector provides signals indicative of the polarity of the input to said other polarity detector, said signals being fed to the voltage monitor.

6. A detector according to claim 5 wherein the voltage monitor includes signal storing means, and switches controlled by the signals from said polarity sensor, the arrangement being such that when one polarity is sensed the signal storage means are supplied with said voltage in one way, and when another polarity is sensed the signal storing means are supplied with said voltage in another way.

7. A detector according to claim 6 wherein the signal storing means comprise a first capacitor which is charged with the output of said phase detector when one polarity is sensed, the signal storage means further comprising an inverter such that said first capacitor is charged with the inverted output of the phase detector when the other polarity is sensed, the apparatus further comprising a second capacitor which is charged with the output of said phase detector when no polarity is sensed.

8. A detector according to claim 6 wherein the signal storage means comprise two capacitors, the arrangement being such that one said capacitor is charged with the output of said phase detector when one polarity is sensed, and the other capacitor is charged with the output of said phase detector when the other polarity is sensed.

9. A detector according to claim 7 wherein a differential amplifier is provided, the inputs to the differential amplifier being connected to the capacitors, the output of the differential amplifier providing the control signal for the adjustable phase shifter.

10. A detector according to claim 8 wherein a differential amplifier is provided, the inputs to the differential amplifier being connected to the capacitors, the output of the differential amplifier providing the control signal for the adjustable phase shifter.

11. A detector according to claim 10 wherein a signal delay device is present between the voltage monitor and the adjustable phase shifter.

12. A detector according to claim 1 comprising a third phase detector, the outputs of the first phase detector and the second phase detector being fed to the inputs of the third phase detector, the apparatus further comprising an RC delay network, the output of the third phase detector being connected to the RC delay network, and the output of the RC delay network being fed to a control terminal of said adjustable phase shifter.

13. A detector according to claim 12 wherein means are provided to reduce the time constant of the RC network to enable a rapid setting of the detector to be obtained.

14. A detector according to claim 13 wherein said means to shorten the RC time constant comprise switchable means.

15. A self regulating detector for detecting impurities in products, said detector comprising a first coil, means for energising the coil to create a field, means for passing said products to be inspected through said field, a second coil located within the field of the first coil to produce an output signal, first and second phase detectors, each having a pair of inputs, the first phase detector being connected so that one input receives a signal representative of the signal energising the first coil and the other input receives the output signal of the second coil, the second phase detector being connected so that one input is connected to receive a signal representative of the signal energising the first coil and the other input is connected to receive the output signal of the second coil, a 90° phase shifter connected to impart a 90° phase shift to one input of said second phase detector, an adjustable phase shifter means, responsive to a control signal, to adjustably phase shift one of the inputs to one of said phase detectors, means for monitoring the output of at least one of the phase detectors to produce a signal representative of the deviation of the output of the monitored phase detector from the linear, thus producing said control signal which is utilized to adjust said adjustable phase shifter.

* * * * *